United States Patent [19]
Dayhoff

[11] Patent Number: 5,025,143
[45] Date of Patent: Jun. 18, 1991

[54] ENHANCED CLUTTER SUPPRESSION APPARATUS FOR USE WITH AN INFRARED SEARCH AND SURVEILLANCE SYSTEM

[75] Inventor: Edward S. Dayhoff, Silver Spring, Md.

[73] Assignee: The United States of America as represented by the Secretary of the Navy, Washington, D.C.

[21] Appl. No.: 395,223

[22] Filed: Jul. 6, 1982

[51] Int. Cl.$^5$ .............................................. H04N 5/21
[52] U.S. Cl. ................................. 250/203.3; 358/167
[58] Field of Search ................... 250/203 R, 578, 334; 356/5; 343/5 CE; 358/167

[56] References Cited

U.S. PATENT DOCUMENTS

| | | | |
|---|---|---|---|
| 3,189,900 | 6/1965 | Raabe | 343/5 CE X |
| 3,508,263 | 4/1970 | Thompson | 343/5 CE X |
| 3,666,367 | 5/1972 | Farnsworth et al. | 356/5 |
| 3,715,497 | 2/1973 | Cooper et al. | 250/203 R X |
| 3,897,150 | 7/1975 | Bridges et al. | 356/5 |

Primary Examiner—Edward P. Westin
Attorney, Agent, or Firm—Kenneth E. Walden; John G. Wynn

[57] ABSTRACT

A clutter suppressor/target locator apparatus is configured to manipulate target video data on a particular channel according to a predetermined algorithm, so as to selectively emphasize those area of a scene containing targets of appreciable contrast to the background and de-emphasize those areas where the brightness levels change gradually from point to point. The algorithm takes into account points ahead and behind the point or picture element being tested, and also equal points or adjacent channels. The apparatus is substantially free of false alarms, and the unique configuration thereof allows detection of the presence of a target on an extremely rapid basis.

5 Claims, 2 Drawing Sheets

ENHANCED CLUTTER SUPPRESSION APPARATUS FOR USE WITH AN INFRARED SEARCH AND SURVEILLANCE SYSTEM

CROSS-REFERENCES TO RELATED APPLICATIONS

U.S. patent application Ser. No. 257,433 to Bell et al., entitled "Pulsed Laser Beam Deviation Apparatus," filed Apr. 24, 1981, and assigned to the same assignee as the present application contains subject matter and apparatus related to and suitable for use with the apparatus disclosed in the present application.

BACKGROUND OF THE INVENTION

1. Field of the Invention

The present invention relates to an apparatus for the detection and discrimination of targets in a marine environment, but more specifically, it relates to a clutter suppression apparatus that substantially eliminates false alarms while detecting the presence of a target in the presence of sea clutter on a rapid basis.

2. Description of the Prior Art

There is a need in the prior art to provide ships with the capability to detect low altitude threats such as sea skimmer missiles. In general, present day radar systems are limited in this ability because of multipath and sea clutter problems. It is also known that the foregoing problems exist with passive infrared detection systems like those contemplated for use with the present invention. However, these passive infrared detection systems do provide other advantages over radar systems, such as high accuracy designation, resolution of closely spaced targets and emission control utility. Nevertheless, there is a need in the prior art to develop a wide range of background normalization and clutter suppression schemes to improve the surveillance capability of existing infrared search and surveillance systems.

To provide adequate surveillance for shipboard use, the passive infrared (electro-optic) system must be able to detect targets at ranges sufficient to allow for timely hand-over to fire control or weapons systems for threat neutralization. Hence, the basic function of an electro-optics surveillance system is to detect a target, sometimes in the presence of severe background clutter, confirm that the target is real, determine the coordinates $(r, \theta, \phi)$ of the target and then hand over these coordinates to a tracking or fire control system at a range sufficient to allow time for an appropriate weapons response. The variables $r$, $\theta$, and $\phi$ are the target range, elevation and azimuth, respectively. The requirements of the active rangefinder portion of an infrared search and surveillance system depend, in large measure, on the precision of the passive detection system in elevation and azimuth. Further, in order to hit the target, it is necessary to aim the rangefinder beam at the target with adequate precision and to satisfy the temporal constraints associated with the particular design configuration of the detection system and its various subsystems, e.g., laser beam aiming device, laser rangefinder device and target detection device in which the present invention can be employed. A laser beam aiming/rangefinder device suitable for use with the present invention is disclosed in the above cited related application. Consequently, there is a need in the prior art to detect a target in the presence of severe background clutter but yet be able to hand-over the coordinates of the target to a tracking or fire control system substantially instantaneously.

The apparatus, according to the present invention, operates on video data that has been digitized. The digitized video data can be generated using a detector block containing a row of suitable infrared detector elements upon which is projected the moving image to be processed so that the row of detectors lies crosswise to the motion of the swept image. Thus, each detector row originates a channel of video data. The simultaneous production of parallel video channels by these detectors defines the complete target video data with which the apparatus according to the present invention operates. After suitable amplification, each channel is digitized by a digitizer producing (n) channels of target digital video information. The rate at which the digitizer produces new digital samples is determined by a system clock pulse train derived from the rotation of a scanning head and therefore synchronized thereto. This motion is read by a shaft encoder which produces a pulse (azimuth clock) with a pulse for the passage of every useable revolution element of the optical system. These shaft encoder pulses are used to time the action of the video digitizers and the action of the apparatus according to the present invention. These pulses are also counted in an azimuthal counter which then provides a coded count which indicates instantaneous direction "of look" for the scanner. This count is reset to zero by a fiduciary mark which is a part of the shaft encoder and ensures an absolute meaning for the azimuthal direction information. For a better understanding of suitable elevational and azimuthal timing schemes, refer to the aforementioned related application.

Based on the foregoing, there is a need in the prior art to interface target locating and similar devices to an electronic processor configured according to the present invention capable of simultaneous handling of (n) channels of target video data to perform a manipulation thereon according to a predetermined algorithm so as to emphasize those areas of the imaged area containing small targets of appreciable contrast to the background area.

The prior art, as indicated hereinabove, include advances in laser beam aiming devices, laser rangefinder devices and even image detection devices including image processors as related to background clutter suppression. However, insofar as can be determined, no prior art image processor for background clutter supression incorporates all of the features and advantages of the present invention.

OBJECTS OF THE INVENTION

Accordingly, an important object of the present invention is to configure a clutter suppressor/target locator apparatus capable of simultaneous handling of suitably digitized channels of video data to perform a manipulation thereon so as to selectively emphasize those areas containing targets of appreciable contrast to the background.

A corollary object of the present invention is to accomplish the foregoing object while de-emphasizing those areas about the targets where the brightness levels change from point to point.

Another object of the present invention is to manipulate the video data so as to take into account points ahead and behind the present point of interest in time so as to enhance the video data in an improved manner.

A further object of the present invention is to eliminate false alarms but yet provide the detection of the presence of a target substantially instantaneously.

Yet another object of the present invention is to be able to interface the clutter suppressor/target locator apparatus with other devices such as a laser rangefinder so that directions, such as the coordinates of the target, can be given thereto in the same scan as the target detection occurrence.

SUMMARY OF THE INVENTION

The clutter suppressor/target colator apparatus, according to the present invention, by which the foregoing and other objects, features and advantages are accomplished and realized is characterized in, inter alia, a signal conductor, a max/min circuitry, and an algorithm circuitry.

The clutter suppressor/target locator apparatus is configured to examine infrared scanning data in the form of digitized video (picture elements), and identify targets by the level of video corresponding thereto. Upon verification of a target, its position is inputted to an associated laser control system which then determines its range.

The apparatus operates on the fact that if a picture element is considerably "hotter" than its immediate neighbors, there is a strong possibility that it contains a target, as natural conditions should not produce such a sharp variation in temperature (level). The apparatus operates by adjusting the level of the tested picture element according to its background via the equation:

$$T' = \frac{T_0}{Max - Min + 1} - \frac{Max + Min}{2}$$

where $T_0$ is the level of the picture element being investigated, Max and Min are the highest and lowest levels, respectively, of the surrounding picture elements, and $T'$ is the adjusted result. The above equation scales the raw data by its environment and substracts the mean level.

The clutter suppressor/target locator apparatus, according to the present invention, implements the algorithm digitally by amplifying the signal, converting it to a binary number, and then manipulating it according to the above equation. If $T'$, the adjusted level of the tested picture element, is above a predetermined target level, it is registered as a target.

BRIEF DESCRIPTION OF THE DRAWINGS

The previously stated objects, other objects, features and advantages of the present invention will be apparent from the following more particular description of a preferred embodiment, as illustrated in the accompanying drawings, in which.

DESCRIPTION OF THE PREFERRED EMBODIMENT

Figure 1:
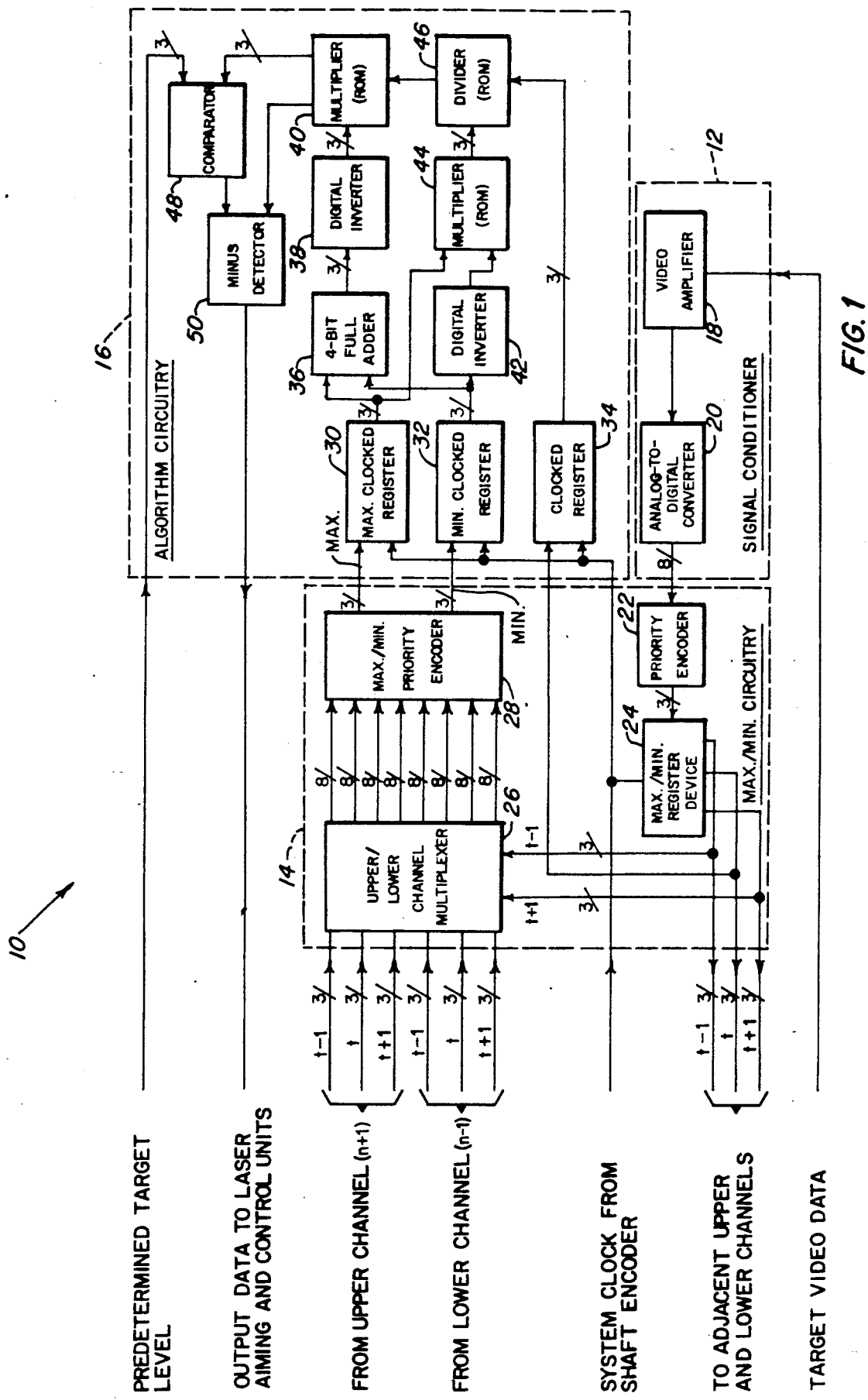
FIG. 1 is a block diagram representation of the ($n^{th}$) channel of the clutter suppressor/target locator including signal conditioner, max/min circuity and algorithm circuitry, according to the present invention.

FIG. 1 shows an embodiment of a clutter suppressor/target locator apparatus 10 in which the present invention is employed to examine infrared scanning data in the form of digitized video picture elements, and identify and verify targets by the level of video corresponding thereto according to a predetermined algorithm. Clutter suppressor/target locator apparatus 10 comprises a signal conditioner 12, a max/min circuitry 14, and an algorithm circuitry 16. Signal conditioner 12 comprises a video amplifier 18 for amplifying the target video data, and inverting it, if desired, and an analog-to-digital converter 20 which inputs the amplified target video data, which is continuously variable, and converts it to a proportional representation in a digital format.

Analog-to-digital converter 20, of signal conditioner 12, is operatively connected to a priority encoder 22 of max/min circuitry 14. Max/min circuitry 14 further comprises a max/min register device 24, an upper/lower channel multiplexer 26, and a max/min priority encoder 28. Priority encoder 22 encodes the digital data from analog-to-digital converter 20, in rank, corresponding to the level of the target video data. It drives max/min register device 24 which stores the data until clocked by a system clock timed from a shaft encoder (not shown). Max/min register device 24 is operatively connected to upper/lower channel multiplexer 24 and to adjacent upper and lower channels, (n+1) and (n−1), respectively, with the block diagram of FIG. 1 being the ($n^{th}$) channel. Upper/lower channel multiplexer 26 also receives data from upper and lower channels (n+1) and (n−1), respectively, and interleaves the data received and distributes it in the interleaved sequence, via eight buses of eight lines each, to max/min priority encoder 28. Max/min priority encoder 28 outputs the data in the form of max and min digital signals on two corresponding buses to a max clocked register 30 and a min clocked register 32, respectively, of algorithm circuitry 16.

To continue, algorithm circuitry 16 further comprises a clocked register 34 which is also operatively connected to max/min register device 24, aforementioned. The system clock previously mentioned also drives the three clocked registers, 30, 32, and 34. Algorithm circuitry 16 also includes a 4-bit full adder 36, a digital inverter 38, a multiplier (ROM) 40, another digital inverter 42, another multiplier (ROM) 44, a divider (ROM) 46, a comparator 48 and a minus detector 50. The operative connections of the foregoing units to implement the algorithm, according to the present invention, is discussed fully in the section entitled, "Statement of the Operation" hereintofollow. It should be noted that the use of digital inverters 38 and 42 is option, in that the substraction function they help to implement can be performed other than as disclosed.

STATEMENT OF THE OPERATION

Figure 2:
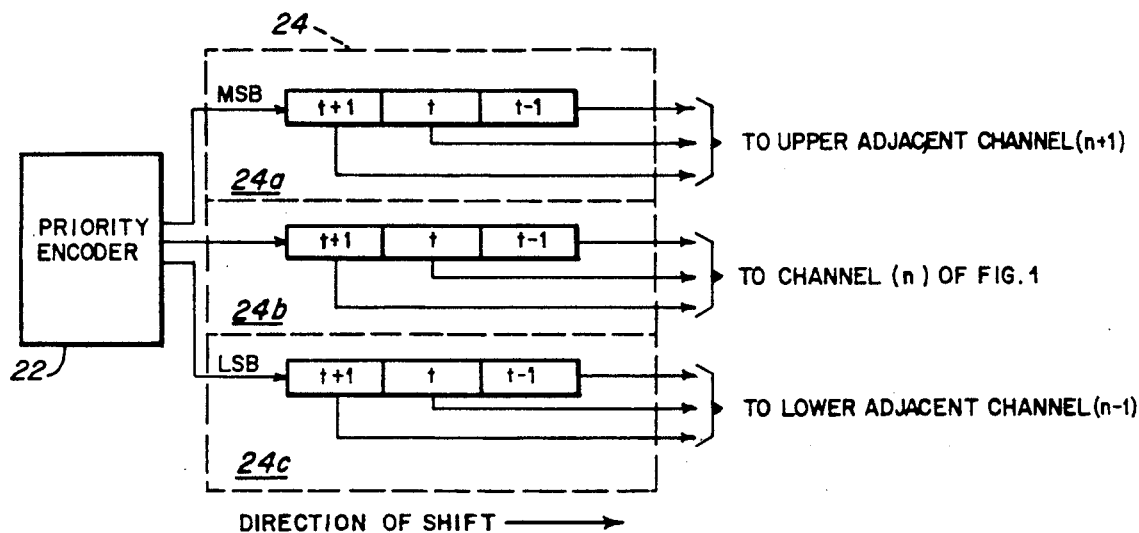
FIG. 2 is a block diagram representation of the max/min register device of the max/min circuitry of FIG. 1 showing the shift register organization thereof.
Figure 3:
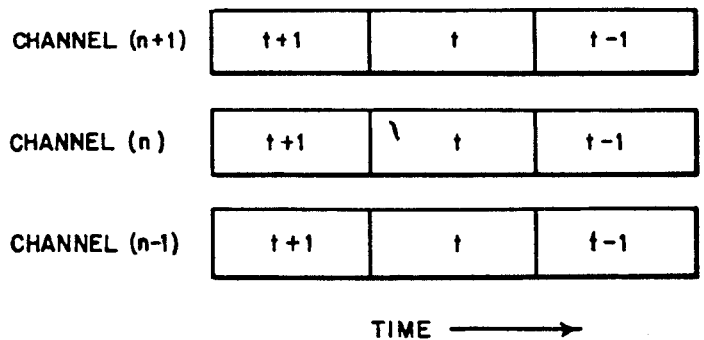
FIG. 3 is a depiction of the information required by the algorithm in testing a picture element (t) on the ($n^{th}$) channel clutter suppressor/target locator of FIG. 1 at a time (t), including the adjacent channel information n+1) and (n+1).

Details of the operation, according to a preferred embodiment of the present invention, are explained in conjunction with FIGS. 1, 2, and 3.

Referring first to FIG. 1, clutter suppressor/target locator apparatus 10, examines target video data (infrared scanning data) and identifies targets by the strength of signals received therefrom. Upon verfication of a target, the position thereof is outputted to laser aiming and control units (not shown) which then determine its range. Apparatus 10 represents a single channel, i.e., the ($n^{th}$) channel. A preferred interchannel communication system employing the present invention would comprise 180 independent and parallel channels, thus requiring one apparatus 10 for each channel.

To continue, detected target video data is fed to video amplifier 18 of signal conditioner 12 where it is amplified and inverted, if desired. This signal is then inputted to analog-to-digital converter 20 where, after conversion, it is passed to priority encoder 22 which yields a 3-bit binary number, one to eight in decimal, corresponding to the level of the signal.

Referring now to FIGS. 1, 2, and 3 as viewed concurrently, the 3-bit binary number is then sorted in three 3-stage shift registers 24a, 24b, and 24c (see FIG. 2) of max/min register device 24. In the foregoing registers is stored the information necessary for implementation of the algorithm previously mentioned, which again is $$T' = \frac{T_0}{\text{Max} - \text{Min} + 1} - \frac{\text{Max} + \text{Min}}{2},$$

where $T_0$ is the level of the picture element (t) being verified or tested, max and min are the highest and lowest levels, respectively, of the surrounding picture elements, as depicted in FIG. 3, and T' is the adjusted result. As shown, max/min register device 24 feeds the adjacent upper and lower channels, (n+1) and (n−1), respectively. At the time, t, that a picture element (t) is being tested, the aforementioned registers are also storing the binary representations of (t+1) and (t−1). They are then fed to upper/lower channel multiplexer 26 of max/min circuitry 14 when clocked by the system clock from the shaft encoder (not shown). A shaft encoder and laser arming and control units suitable for interfacing with the present invention are disclosed in the previously mentioned related application. Also, the binary representation of the picture element (t) from the three 3-bit registers 24a, 24b, and 24c is fed to clocked register 34 of algorithm circuitry 16. This register is also clocked by the system clock, aforementioned.

As depicted in FIG. 3, the algorithm also requires information from the adjacent upper channel (n+1) and the adjacent lower channel (n−1) about target signal levels at times t−1 t, and t+1, and corresponding picture elements. Accordingly, this information, represented by six 3-bit binary numbers, feeds upper/lower channel multiplexer 26, as shown. Upper/lower channel multiplexer 26 outputs a logic "one" on one of eight lines of eight buses according to the decimal value of its inputs. The eight buses, including eight lines each, drive max/min priority encoder 28 which decodes the buses into two buses of three lines each. Thus, so far, the signals have been decoded from three lines to eight lines back to three lines. While this may appear unnecessary, it is infact the quickest way to obtain the maximum and minimum values in binary form on the two buses as it take advantage of the presently available priority encoder chip used to configure max/min priority encoder 28.

Referring now primarily to FIG. 1, the maximum and minimum values are stored in max clocked register 30 and min clocked register 32, respectively, and the 3-bit binary number representing the picture element (t) to be tested is stored in clocked register 34 as aforementioned. Each of the foregoing registers is driven by the system clock. The partial results, the value max+min and the value max-min are obtained from, inter alia, 4-bit full adder 36. The means, (max+min)/2 is found by taking the upper three bits of the answer and ignoring the LSB. This corresponds to division by 2 in binary. To implement the substraction value, the min value is inverted via digital inverter 42 and the carry input (not shown) of 4-bit full adder 36 is set at an "up" level. The inverted min value and the max value is multiplied in a multiplier 44 which drives divider 46. Divider 46 is programmed for all possible inputs so that the two operants will address the answer. The mean of the max+min value is taken by simply ignoring the least significant bit (LSB) of the sum and treating the n+1$^{st}$ digit as the n$^{th}$. This shift to the right by one place is equivalent to division by two in binary. The mean is substracted from the division result in multiplier 40 via inputs thereto from digital inverter 38 and divider 46 by the technique aforementioned.

Still referring to FIG. 1, the result, T', is the adjusted target signal level of the picture element (t) on channel (n) at time t (see FIG. 3). This is compared in comparator 48 with a predetermined target or reference level. If the result of the algorithm is greater than the reference level, then a logic "one" is outputted to minus detector 50 which is also driven by multiplier 40. The output data from minus detector 50 is gated with the sign bit of the result of the final substraction in multiplier 40 to protect against false alarms should the result be of a negative value. A logic "one" emerging from minus detector 50 indicates the presence of a target.

Thus, the equation, aforementioned, scales the raw target data by its environment and substracts the mean level therefrom. Clutter suppressor/target locator 10, implements the algorithm digitally by amplifying the target signal, converting it to a binary number, and then manipulating it according to the equation. Hence, as stated previously, if, T', the adjusted target level, is above the predetermined target level, it is registered as a target. The background used by the equation is defined as the eight cells or picture elements surrounding the tested picture element as shown in hatched marks in FIG. 3.

To those skilled in the art of interest, many modifications and variations of the present invention are possible in light of the above teachings. It is therefore to be understood that the present invention can be practiced otherwise than as specifically described herein and still be within the spirit and scope of the appended claims.

What is claimed is:

1. A clutter suppressor/target locator apparatus having (n) identical channels for examining infrared scanning data in the form of target video data (picture elements) from an associated infrared search and surveillance system which includes a shaft encoder, and laser aiming and control units, the ($n^{th}$) channel of said clutter suppressor/target locator apparatus comprising:

a signal conditioner for amplifying the target video data, which is continuously variable in terms of picture elements, and for converting the target video data, after amplification, into a proportional representation in a digital format:

max/min circuitry operatively connected to said signal conditioner, to the upper channel corresponding to the $(n+1)^{st}$ channel of the identical channels, the lower channel corresponding to the $(n-1)^{st}$ channel of the identical channels, and to a clock derived from the shaft encoder of the infrared search and surveillance system, said max/min circuitry operating to generate the maximum and minimum values in binary form, on two corresponding output buses, of the target video data corresponding to channels (n+1) (n), and (n−1); and algorithm circuitry operatively connected to said max/min circuitry, to the clock derived from the shaft encoder, and to a predetermined target level, said algorithm circuitry operating so as to implement a predetermined algorithm digitally, the maximum and minimum values in binary form being manipulated according to the predetermined algorithm, which is, $$T' = \frac{T_0}{\text{Max} - \text{Min} + 1} - \frac{\text{Max} + \text{Min}}{2},$$

where $T_0$ is the level of the picture element being tested, max and min are the highest and lowest levels, respectively, of the picture elements surrounding the picture element being tested, and T' is the adjusted target level, said algorithm circuitry operating to output "one" if the adjusted target level is above the predetermined target level.

2. The apparatus of claim 1 wherein said signal conditioner comprises:
a video amplifier for amplifying the target video data to a suitable level for subsequent processing; and
an analog-to-digital converter operatively connected to said video amplifier for converting the target video data into the proportional representation in the digital format.

3. The apparatus of claim 2 wherein said max/min circuitry comprises:
a priority encoder operatively connected to said analog-to-digital converter of said signal conditioner for deriving a 3-bit binary number corresponding to the level of the target video data in the digital format;
a max/min register device operatively connected to said priority encoder, to the upper channel corresponding to the $(n+1)^{st}$ channel of the identical channels, to the lower channel corresponding to the $(n-1)^{st}$ channel of the identical channels, and to the clock derived from the shaft encoder, said max/min register device storing the binary representation of the picture element (t) being tested, and the picture elements (t+1) and (−1), until clocked by the clock derived from the shaft encoder;
an upper/lower channel multiplexer operatively connected to said max/min register device so as to receive the binary representation of the picture elements (t+1) and (t−1), and operatively connected to the upper channel corresponding to the $(n+1)^{st}$ channel of the identical channels, and to the lower channel corresponding to the $(n-1)^{st}$ channel of the identical channels, so as to receive the binary representation of the picture elements (t+1), (t), and (t−1) from each of the channels such that the data received is interleaved and distributed according to the interleaved sequence; and
a max/min priority encoder operatively connected to said upper/lower channel multiplexer for outputting the interleaved data in the form of maximum and minimum values in binary form on two corresponding buses.

4. The apparatus of claim 3 wherein said algorithm circuitry comprises:
a max clocked register operatively connected to said max/min priority encoder and the clock derived from the shaft encoder for storing the 3-bit binary number representative of the maximum value of the target video data until clocked by the clock derived from the shaft encoder;
a min clocked register operatively connected to said max/min priority encoder and the clock derived from the shaft encoder for storing the 3-bit binary number representative of the minimum value of the target video data until clocked by the clock derived from the shaft encoder;
a clocked register operatively connected to said max/min register device and the clock derived from the shaft encoder for storing the 3-bit binary number representative of the picture element (t) to be tested until clocked by the clock derived from the shaft encoder;
a 4-bit full adder operatively connected to said max clocked register and said min clocked register for adding the maximum and minimum values in such a way as to calculate the mean, (max+min)/2, the mean being found by taking the upper three bits of the answer and ignoring the least significant bit (LSB), the results corresponding to division by two in binary;
means operatively connected to said min clocked register for inverting the minimum value of the target video data;
means operatively connected to said max clocked register and to said means for inverting the minimum value for multiplying the inverted minimum value and the maximum value;
means operatively connected to said means for multiplying the inverted minimum value and the maximum value and to said clocked register for dividing the binary number representative of the picture element (t) by the inverted minimum value and maximum value product;
means operatively connected to said 4-bit full adder for inverting the mean value, (max+min)/2;
means operatively connected to means for inverting the mean value and to said means for dividing for multiplying the inverted mean value and the output of said means for dividing so as to produce the adjusted target signal level, T', of the picture element (t) at time (t) on channel (n);
a comparator operatively connected to said means for multiplying the inverted mean value and the output of said means for dividing and connected to the predetermined target level so as to output a logic "one" if the adjusted target signal level, T', is greater than the predetermined target level; and
a minus detector operatively connected to said means for multiplying the inverted mean value and to said comparator, said minus detector being gated with the sign bit from said means for multiplying so as to protect against false alarms should the adjusted target signal level, T', be of a negative value by the outputting of a logic "one" from said minus detector indicating the presence of a target.

5. The apparatus of claim 4 wherein said max/min register device comprises three 3-stage shift registers for storing the binary representations of the picture elements corresponding to (t+1), (t), and (t−1) for upper channel (n+1), channel (n), and lower channel (n−1), respectively.

* * * * *